3,061,452
OXIDATION OF CYCLODODECATRIENE-1,5,9

Robert J. Convery, Wilmington, Del., assignor to Sun Oil Company, Philadelphia, Pa., a corporation of New Jersey
No Drawing. Filed July 16, 1959, Ser. No. 827,427
5 Claims. (Cl. 106—287)

This invention relates to the oxidation of cyclododecatriene-1,5,9 by means of molecular oxygen, to the viscous oily product obtained as a result of such oxidation and to paint and varnish composition comprising such product as a drying oil.

It is known that cyclododecatriene-1,5,9 can be prepared by contacting butadiene with a catalyst formed from titanium tetrachloride and diethyl aluminum chloride in a hydrocarbon solvent. This catalyst system produces the trans-trans-cis form of the triene. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces the trans-trans-trans form of the triene.

The present invention provides a method for oxidizing either form of cyclododecatriene-1,5,9 to produce a novel viscous oily product which contains peroxide groups and also carboxyl groups. The resulting product when exposed to air acts as a drying oil and hence can be utilized as a drying oil component of paints and varnishes.

According to the invention cyclododecatriene-1,5,9 is contacted at an elevated temperature with molecular oxygen which can be in the form of air but preferably is in a pure state. The temperature of contact should be in the range of 60–120° C., more preferably, 70–100° C. Reaction between the oxygen and the triene occurs to yield reaction product having both peroxide and carboxyl groups. No catalyst is required for the reaction, although an oxidation catalyst such as cobalt naphthenate can be employed to increase the rate of reaction if desired. Increase in oxygen pressure also speeds the reaction, but it is often preferable to operate at about atmospheric pressure as a matter of convenience. Contact between the triene and the oxygen is continued until the reaction mixture contains at least 10% by weight of titratable peroxide and more preferably at least 15–30%. By "titratable peroxide" is meant the amount determined by titration according to the method described in "Organic Peroxides" by Tabolsky et al. (Interscience Publishers, Inc., New York, 1954), on page 53. The amount of "titratable peroxide" so determined is calculated as cyclododecatriene·OOH or, in other words, as if only one peroxide group attached to a cyclododecatriene molecule.

Following the reaction period, the desired viscous oily product can be separated from the reaction mixture by distilling off any lower boiling material, such as unreacted cyclododecatriene, under vacuum. An alternative procedure for obtaining the viscous oil involves adding to the reaction mixture a relatively low boiling nonaromatic hydrocarbon, for example pentane. This acts as an antisolvent for the oxygenated material and causes it to separate. In place of pentane other aliphatic or cycloaliphatic hydrocarbons, preferably having 3–8 carbons atoms, can be employed. Olefins can also be used as the antisolvent, although they are not preferred. Aromatic hydrocarbons tend to act as solvents for the oxidation product and hence should not be used.

The viscous oily liquid obtained in the above-described manner appears to be a polymeric material and can be shown to contain peroxide groups by titration according to the method referred to above. It also contains carboxyl groups as shown by infrared spectroscopy. Upon exposure to air at room temperature it becomes more viscous and forms a surface skin. This drying characteristic makes it particularly suitable for use in paints and varnishes.

In employing the oxygenated product for the preparation of paint or varnish coating compositions, it can be employed in the same manner as other drying oils such as linseed, tung, safflower, soybean or other known drying oils. For a description of various paint and varnish formulation, reference should be made to "Encyclopedia of Chemical Technology," vol. 9, pp. 770–795, and vol. 14, pp. 645–663. In general these compositions comprise as essential components a drying oil, a thinner such as mineral spirits and a drier such as cobalt, lead or manganese naphthenate, together with various other ingredients such as pigments, fillers and resins. The oxygenated product of the present invention can be used in such formulations as the sole drying oil component or in combination with other drying oils. For example, in known paint compositions utilizing linseed oil as the so-called binder or drying oil component, a portion or all of the linseed oil can be replaced by the oxygenated product of the present invention. This is likewise true for known varnish compositions.

The following is a more specific illustration of the invention:

Cyclododecatriene-1,5,9 is prepared in the form of its trans-trans-cis isomer by reacting butadiene in the presence of a catalyst system prepared by admixing $TiCl_4$ and diethyl aluminum chloride in a hydrocarbon solvent. The prepared triene is heated to a temperature of 80° C. and maintained at such temperature level while bubbling pure oxygen through it for 10 hours. At the end of this time a sample of the reaction mixture is found to have a titratable oxygen content of about 25%, calculated as cyclododecatriene·OOH on a weight basis. The reaction mixture is then cooled to room temperature and admixed with pentane in a volume ratio of reaction mixture to pentane of 1 to 2.5. Upon standing the resulting mixture stratifies into two layers which are separated from each other. The lower layer is a viscous oily liquid containing a small amount of pentane which is removed by evaporization in the absence of air. The yeild of viscous oil obtained is 20% by weight based on the cyclododecatriene used.

As one example of the use of the viscous oxidation product in preparing coating compositions, a white paint can be made by compounding the oxidation product with other ingredients according to the following formulation in which parts are by weight:

| | Parts |
|---|---|
| Oxidation product | 100 |
| Alkali refined linseed oil | 300 |
| Mineral spirits | 120 |
| Titanium dioxide | 120 |
| Cofumed 35% leaded zinc oxide | 400 |
| Magnesium silicate | 280 |
| Lead naphthenate | 11 |
| Manganese naphthenate | 2 |

While in the foregoing formulation the oxidation product is used in combination with another drying oil, numerous paint and varnish compositions can be prepared in which the oxidation product is the only drying oil component employed in the mixture.

I claim:
1. Method of forming an oxidation product of cyclododecatriene-1,5,9 which comprises contacting cyclododecatriene-1,5,9 at a temperature in the range of 60–120° C. with molecular oxygen for a time sufficient to pro- duce from 10% to 30% by weight of titratable peroxide (calculated as cyclododecatriene·OOH) and separating from the reaction mixture a viscous oily product containing both peroxide and carboxyl groups.

2. The viscous oily product formed by the method of claim 1.

3. Method according to claim 1 wherein the temperature is in the range of 70–100° C. and the contacting time is sufficient to produce at least 20% of titratable peroxide.

4. Method according to claim 1 wherein said product is separated from the reaction mixture by adding a non-aromatic hydrocarbon having 3–8 carbon atoms which functions as an anti-solvent for said product.

5. A paint or varnish coating composition comprising a drying oil, a thinner and a drier, wherein said drying oil constitutes the viscous oily product formed by the oxidation of cyclododecatriene-1,5,9 in accordance with claim 1, the amount of said product being sufficient to impart drying qualities to the composition.

References Cited in the file of this patent

UNITED STATES PATENTS

| | | |
|---|---|---|
| 1,689,599 | Ramage | Oct. 30, 1928 |
| 2,129,925 | Gardner | Sept. 13, 1938 |
| 2,430,864 | Farkas | Nov. 18, 1947 |
| 2,580,184 | Murray | Dec. 25, 1951 |

FOREIGN PATENTS

| | | |
|---|---|---|
| 738,075 | France | Dec. 20, 1932 |

OTHER REFERENCES

Charles E. Frank, Chem. Rev., vol. 46, February 1950, pages 155 to 169.

Hock, Ange Chemie, vol. 69, pages 313–321, May 21, 1957.